(12) United States Patent
Bellett et al.

(10) Patent No.: US 11,422,255 B2
(45) Date of Patent: Aug. 23, 2022

(54) SLOPE STABILITY LIDAR

(71) Applicant: GroundProbe Pty Ltd, Windsor (AU)

(72) Inventors: Patrick T. Bellett, Windsor (AU); Lachlan Campbell, Windsor (AU)

(73) Assignee: GroundProbe Pty Ltd, Windsor (AU)

( * ) Notice: Subject to any disclaimer, the term of this patent is extended or adjusted under 35 U.S.C. 154(b) by 965 days.

(21) Appl. No.: 15/767,073

(22) PCT Filed: Oct. 12, 2016

(86) PCT No.: PCT/AU2016/050953
§ 371 (c)(1),
(2) Date: Apr. 9, 2018

(87) PCT Pub. No.: WO2017/063033
PCT Pub. Date: Apr. 20, 2017

(65) Prior Publication Data
US 2018/0299551 A1 Oct. 18, 2018

(30) Foreign Application Priority Data

Oct. 12, 2015 (AU) .................... 2015904141

(51) Int. Cl.
*G01S 17/00* (2020.01)
*G01S 17/10* (2020.01)
(Continued)

(52) U.S. Cl.
CPC .............. *G01S 17/10* (2013.01); *E02D 17/18* (2013.01); *G01S 7/51* (2013.01); *G01S 17/42* (2013.01); *G01S 17/50* (2013.01); *G01S 17/89* (2013.01)

(58) Field of Classification Search
USPC ....................................................... 356/4.01
See application file for complete search history.

(56) References Cited

U.S. PATENT DOCUMENTS

| 9,110,163 B2* | 8/2015 | Rogan ..................... G01S 17/50 |
| 10,194,829 B2* | 2/2019 | Kaditz .................. A61B 5/055 |

(Continued)

FOREIGN PATENT DOCUMENTS

| KR | 101009657 B1 | 1/2011 |
| WO | 2012/100288 A1 | 8/2012 |
| WO | 2014/201075 A1 | 12/2014 |

OTHER PUBLICATIONS

M. Dylan Tisdall, Aaron T. Hess, Martin Reuter, Ernesta M. Meintjes, Bruce Fischl, and André J. W. van der Kouwe. "Volumetric Navigators for Prospective Motion Correction and Selective Reacquisition in Neuroanatomical MRI". Magnetic Resonance in Medicine 68:389-399 (Year: 2012).*

(Continued)

*Primary Examiner* — James R Hulka
(74) *Attorney, Agent, or Firm* — Howard & Howard Attorneys LLC (57) ABSTRACT

A Slope Stability Lidar that directs a beam of optical radiation into an area on a point by point basis, each point having an elevation and azimuth and a processor that acquires data and processes the data to compile direction data, range data and amplitude data for each point, segments the acquired data into blocks of data defining a voxel, averaging the acquired range data within the voxel to produce a precise voxel range value for each voxel, comparing voxel range values over time to identify movement and generating an alert if movement exceeds a threshold.

19 Claims, 11 Drawing Sheets

(51) Int. Cl.
*E02D 17/18* (2006.01)
*G01S 17/89* (2020.01)
*G01S 17/42* (2006.01)
*G01S 17/50* (2006.01)
*G01S 7/51* (2006.01)

(56) References Cited

U.S. PATENT DOCUMENTS

| | | | | |
|---|---|---|---|---|
| 2010/0053593 | A1* | 3/2010 | Bedros | G01S 17/931 356/5.01 |
| 2010/0204964 | A1* | 8/2010 | Pack | G06T 7/521 703/1 |
| 2011/0149268 | A1* | 6/2011 | Marchant | G01S 17/58 356/27 |
| 2013/0051655 | A1* | 2/2013 | Collard | G01S 7/4873 382/154 |
| 2013/0265189 | A1* | 10/2013 | Chang | G01S 13/87 342/52 |
| 2013/0338930 | A1* | 12/2013 | Senegas | G01R 33/546 702/19 |
| 2014/0267250 | A1 | 9/2014 | Tennant et al. | |
| 2014/0368493 | A1* | 12/2014 | Rogan | G06K 9/00201 345/419 |
| 2014/0368807 | A1* | 12/2014 | Rogan | G01S 7/4808 356/28 |
| 2015/0228092 | A1* | 8/2015 | Claus | A61B 6/5205 382/131 |
| 2016/0084651 | A1* | 3/2016 | Hinderling | H01L 31/165 356/4.01 |
| 2017/0007148 | A1* | 1/2017 | Kaditz | A61B 5/055 |
| 2017/0011514 | A1* | 1/2017 | Westerhoff | G06T 7/0012 |
| 2017/0364250 | A1* | 12/2017 | Bellett | G06T 7/33 |
| 2017/0371029 | A1* | 12/2017 | Axelsson | G01S 7/4812 |
| 2018/0267160 | A1* | 9/2018 | Slemp | G01S 13/42 |
| 2018/0364717 | A1* | 12/2018 | Douillard | G06K 9/00791 |
| 2019/0258737 | A1* | 8/2019 | Wang | G06F 16/29 |
| 2019/0332118 | A1* | 10/2019 | Wang | G06K 9/00805 |

OTHER PUBLICATIONS

International Search Report and Written Opinion (International Application No. PCT/AU2016/050953); dated Jan. 3, 2017.
Hui, H., "Deformation monitoring and modeling based on LiDAR data for slope stability assessment", Doctoral Thesis RWTH Aachen University RWTH Publications, Record created Jul. 16, 2014 <URL http://publications.rwth-aachen.de/reord/229874/files/4584.pdf> title, abstract; fig. 3.3, 4.5, 4.6, 5.1, 5.9, 5.15, 5.16, 5.20, 6.17; p. 4 line 11-16, pag. 15 line 9-18, p. 42-43 Section 4.1.2, p. 46-88 whole pages but especially Sections 4.3, 4.4.2, 5, p. 83 last 3 lines, p. 92 Section 6.2.1.
Reyes, R. et al., "Using Statistical Methods to Correct LIDAR Intensities from Geological Outcrops", ASPRS/MAPPS 2009 Fall Conference Nov. 16-19, 2009 San Antonio Texas, <urs: http//web.archive.org/web20150909225046/http://ww.asprs.org/a/publications/proceedings/sanantonio09/Reyes.pdf>Published on Sep. 9, 2015 as per Wayback Machine.
Comminication received from foreign patent office concerning 3rd party Submission (AU Application No. 2016340027); dated May 3, 2019; 200 pages.
I-SITE_4400LR_email.pdf, 2006, Jason Richards.†
4400_specsheet.pdf, Aug. 10, 2005, Maptek Pty Ltd.†
Forge4_2003.pdf, 2003, Maptek Pty Ltd.†
Scanning general.ppt, 2010, Maptek Pty Ltd.†
I-Site_Timeline_2018 (1).pdf, Maptek Pty Ltd.†
I-Site_4400LR_specs.pdf, 2009, Maptek Pty Ltd.†
Laser scanning in the open pit mining environment.pdf, Jul. 1, 2006, Simon Ratcliffe and Andrew Myers.†

* cited by examiner
† cited by third party

SLOPE STABILITY LIDAR

CROSS-REFERENCE TO RELATED APPLICATIONS

This application is a National Phase of the PCT application number PCT/AU2016/050953, filed on Oct. 12, 2016, which claims priority to, and all the benefits of, Australian Patent Application No. 2015904141 filed on Oct. 12, 2015 both of which are hereby incorporated in its entirety by reference.

FIELD OF THE INVENTION

The present invention relates to a method and apparatus for monitoring slope deformation using laser ranging. The invention finds particular application in open cut and underground mining applications.

BACKGROUND OF THE INVENTION

The Applicant has previously described a Slope Monitoring System based on using interferometric radar measurements to detect movement of an observed slope. The technique is well described in our International Patent Application number WO2002/046790. In one important application the Slope Stability Radar (SSR) described in WO2002/046790 is used to monitor rock walls in an open cut mine to detect any dangerous movement that may lead to slope failure.

The Applicant's SSR devices have proven to be very effective and have enjoyed significant commercial success. The content of WO2002/046790 is incorporated herein by reference in its entirety.

In WO2002/046790 reference is made to the use of laser EDM (Electronic Distance Measurement) as a tool that was used at that time to measure the dilation of cracks appearing on the crest or face of the rock slope. Most of the laser-based techniques monitor points or lines on a wall rather than an area of the wall face. This has meant that laser-based distance measurement systems have not been useful for deformation monitoring in mining applications, or similar situations.

For instance, Hu Hui has published a detailed doctoral thesis from Aachen University, Germany titled, "Deformation monitoring and modelling based on LiDAR data for slope stability assessment". As recognised by Hui on page 17, "The challenge is how to efficiently analyse the LiDAR data and how to extract the valuable information (e.g. deformation signs) from huge amounts of data". Hui does not present a solution except to apply greater processing power or limit the scan to reduce the amount of data. In spite of the best efforts of Hui the sub-millimetre precision required for slope monitoring is not demonstrated.

Reference may also be had to a useful review paper published online in 2010 and in Natural Hazards (2012) 61:5-28 with the title "Use of LIDAR in landslide investigations: a review". The paper provides a useful discussion of LIDAR and is incorporated herein by reference.

In the conclusion section the authors make a number of relevant points about the limitation of LIDAR in slope stability monitoring including, "In a few years, LIDAR sensors will probably be a standard tool for landslide analysis . . . . As the technique is also progressing, more accurate and precise ALS (airborne laser scanner) and TLS (terrestrial laser scanner) devices will appear, allowing for the generation of more accurate DEM (digital elevation map) . . . . Nevertheless, the huge amount of data will remain a problem as the computers will need to be more powerful with increasing data acquisition capacity as it is already the case with mobile LIDAR systems that have an acquisition rate of up to 200 kHz. The real challenge is to develop new methods to better take benefit from HRDEM (high resolution digital elevation map). Indeed a lot of new information can be extracted from such DEM that we not yet contrived to do. Although great advances have been developed in geometrical aspects, most of the conceptual models remain tied to the past". These comments are still applicable today.

SUMMARY OF THE INVENTION

In one form, although it need not be the only or indeed the broadest form, the invention resides in a Slope Stability Lidar comprising:
  a laser producing a beam of optical radiation;
  a scanner that directs the beam of optical radiation into an area on a point by point basis, each point having an elevation and azimuth with respect to the laser;
  a detector that receives reflected optical radiation from each point;
  a processor programmed to:
  acquire data from the detector and process the data to compile direction data, range data and amplitude data for each point;
  segment the acquired data into blocks of data defining a voxel;
  average the acquired range data within the voxel to produce a precise voxel range value for each voxel;
  compare voxel range values over time to identify movement; and
  generate an alert if movement exceeds a threshold.

The processor may also be programmed to average the acquired amplitude data to produce an average amplitude value for each voxel. The average amplitude value for each voxel may be used by the processor to generate a display of an image of the area. The processor may also display the identified movement on the image of the area.

The alert may be audible, visual or tactile. A visual alert may suitably be displayed on the display.

Suitably the processor of the Slope Stability Lidar may co-register the image of the area with a photograph or video of the area. The Slope Stability Lidar suitably comprises a camera that records the photograph or video.

The laser is preferably a pulsed laser and the processor determines range to a point using a time of flight calculation.

The scanner suitably scans the laser beam in azimuth using a rotating base and in elevation using a rotating mirror.

The location of each point may be determined in Cartesian coordinates (x,y,z) or polar coordinates $(r,\theta,\phi)$. Each block forming a voxel may be selected based on a specific voxel size, such as all range points within an azimuth by elevation of 0.5 degrees by 0.5 degrees. The voxel size may have an azimuth of from 0.1 degrees to 1.0 degrees. The elevation may be 0.1 degrees to 1.0 degrees. The voxel size may be any combination of azimuth by elevation from 0.1 degrees×0.1 degrees to 1.0 degrees by 1.0 degrees. Some examples include 0.2 degrees by 0.3 degrees, 0.5 degrees by 0.4 degrees, or any other suitable size.

The voxel size may also have range limits rather than averaging all ranges within an elevation by azimuth. Range limits may be applied to exclude ranges that have known artefacts, for example a road.

In a further form the invention resides in a method of monitoring slope movement including the steps of:

directing a beam of optical radiation into an area;

scanning the beam of optical radiation in elevation and azimuth so as to cover the area on a point by point basis;

detecting radiation reflected from each point;

acquiring data from the detector and processing the data to compile direction data, range data and amplitude data for each point;

segmenting the acquired data into blocks of data defining a voxel;

averaging the acquired range data within the voxel to produce a precise range value;

comparing voxel range values over time to identify movement; and generating an alert if movement exceeds a threshold.

The method may further include the step of averaging the acquired amplitude data to produce an average amplitude value for each voxel. The average amplitude value for each voxel may be used in a further step of the method to generate a display of an image of the area. The identified movement may suitably be displayed on the image of the area.

The display may be co-registered with a photographic or video image of the area.

Further features and advantages of the present invention will become apparent from the following detailed description.

BRIEF DESCRIPTION OF THE DRAWINGS

To assist in understanding the invention and to enable a person skilled in the art to put the invention into practical effect, preferred embodiments of the invention will be described by way of example only with reference to the accompanying drawings, in which.

DETAILED DESCRIPTION OF INVENTION

Embodiments of the present invention reside primarily in a Slope Stability Lidar apparatus that utilizes a laser to monitor the movement of a slope, wall or other region which may be subject to movement. Accordingly, the elements of the device have been illustrated in concise schematic form in the drawings, showing only those specific details that are necessary for understanding the embodiments of the present invention, but so as not to obscure the disclosure with excessive detail that will be readily apparent to those of ordinary skill in the art having the benefit of the present description.

In this specification, adjectives such as first and second, left and right, and the like may be used solely to distinguish one element or action from another element or action without necessarily requiring or implying any actual such relationship or order. Words such as "comprises" or "includes" are intended to define a non-exclusive inclusion, such that a process, method, article, or apparatus that comprises a list of elements does not include only those elements but may include other elements not expressly listed, including elements that are inherent to such a process, method, article, or apparatus.

Figure 1:
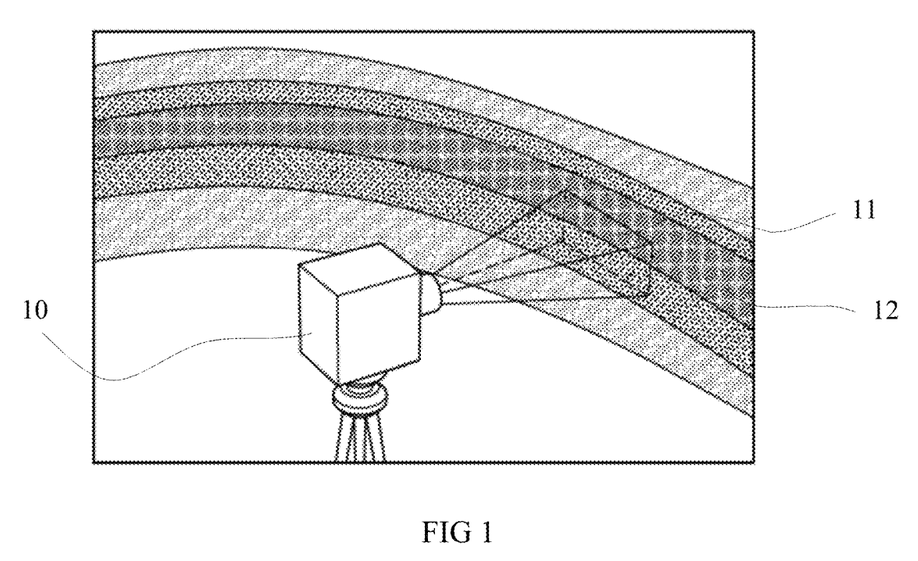
FIG. 1 is a sketch of a Slope Stability Lidar in an open cut mine application.

Referring to FIG. 1 there is shown a Slope Stability Lidar 10 that is viewing a scene 11 that may have regions which are stable and other regions which are moving. In the embodiment of FIG. 1 the scene 11 is part of the slope of an open cut mine 12, but as explained below the invention is not limited to this application. The Lidar 10 may be a commercially available device such as a Leica Scanstation P20 available from Leica Geosystems or it may be a proprietary device. The elements of the Lidar 10 are shown schematically in the block diagram of FIG. 2. The Lidar 10 is constructed from a pulsed laser 101, scanner 102, receiver 103, processor 104 and various output options 105.

Figure 2:
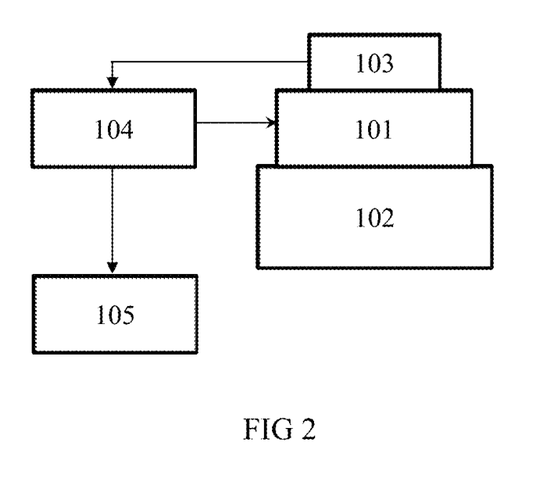
FIG. 2 is a block diagram of the components of a Slope Stability Lidar.

The Lidar produces a "point cloud" of a scene by scanning the laser in azimuth and elevation. The point cloud is commonly displayed as a colour-coded intensity or amplitude map that displays the amplitude (or intensity) of the reflected laser light for each azimuth, elevation and range point. The laser repetitively sends out pulses and detects each reflected pulse. The time between sending the pulse and receiving the reflection is used to calculate distance from the laser using time of flight. The combination of azimuth, elevation and distance is used by the processor to construct a three dimensional (3D) image of a scene around the Lidar. Although it is possible to generate the scene in a complete dome around the Lidar it is the case in most applications that only a small section of the dome is of interest.

Scanning of the laser may be achieved by any appropriate technique but it has been found that a spinning or oscillating mirror is effective for providing the elevation scan and a rotating base is effective for the azimuth scan.

The output 105 may be an image of the scene but the point data may also be accessed directly for further or alternate processing. Terrestrial Lidar scanners use all data that is collected to generate the scene. They produce a high quality image, which is to say that the range and direction measurements have high resolution, but a relatively long time is required to generate the image and a large data file is produced. The inventors have realized that the timescale to generate a data file and to process the data file to produce a scene using Lidar is too long to be useful for monitoring a region, such as a slope or a wall, for movement. The inventors have therefore developed a new processing approach that achieves useful movement data in a much shorter time and with much greater range precision than is conventionally available using Lidar.

The inventors have also found that the precision of laser scanning is not sufficient for movement detection in many applications, particularly safety applications such as monitoring rock/slope movement in a mine. The laser measurement precision is affected by range, colour of the target, sensor settings and environment. It is not unusual to measure movement noise of up to +/−8 mm for a stationary target. The process developed by the inventors increases the precision significantly so that Lidar can be used for rock/slope movement detection.

Figure 3:
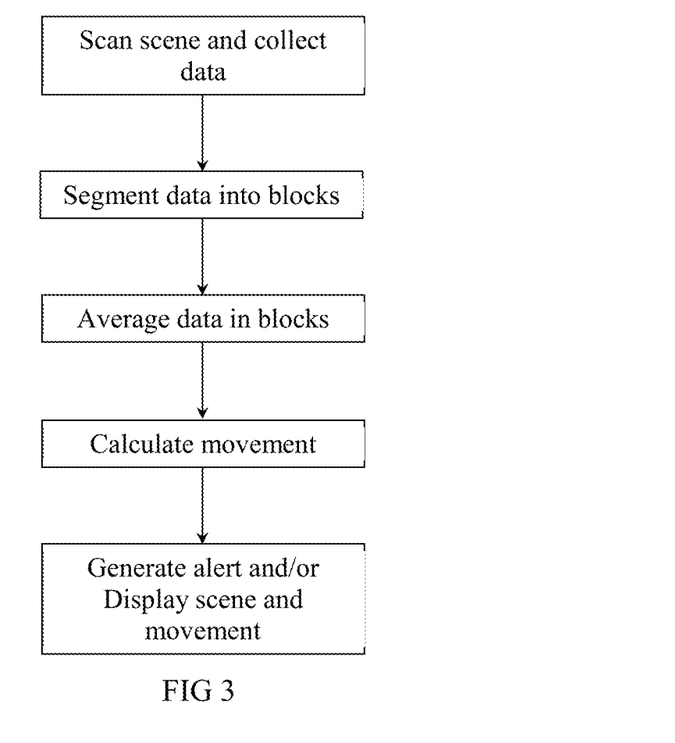
FIG. 3 is a flowchart of the processing steps of a Slope Stability Lidar.

Referring to FIG. 3, there is shown a flowchart summarizing the steps for producing movement data using Slope Stability Lidar. The point cloud data is collected in the usual manner but an averaging method is used to calculate a value for average amplitude (or intensity) at a precise range measured in a segment of the region. The size of the segment is selected as a suitable trade off against resolution to improve precision. A typical segment will have an extent of 0.5 degrees×0.5 degrees and contain from several hundred to several thousand points from the point cloud. The selected segment is suitably circular but other shapes may also be selected such as a rectangle, triangle, hexagon or polygon.

The averaging process may be a simple average of the amplitude (or intensity) and range of all points within the selected segment. Alternatively the average may be a more complicated averaging process, for example by underweighting the values towards the periphery of the selected segment compared to the values towards the center of the segment.

The segments may be contiguous or may overlap by a determined amount. In most cases it will not be appropriate to omit points by leaving a space between the selected segments.

By way of example, the Leica ScanStation P20 (mentioned above) produces high density and high resolution point cloud data that can be advantageously used to increase the range precision of the scanner by applying a spatial averaging algorithm which trades-off high angular resolution for range precision. The spatial averaging algorithm can be described in three steps:
1. Spherical parameterization of scanner coordinates;
2. Segmentation of data evenly in the azimuth and elevation direction (with coarse range bins);
3. Applying a weighted average for each segment with respect to the true centre value.

An optional fourth step is to display the data in a pixel that may be smaller than the averaged area. The pixel is most suitably square but could be hexagonal, circular or some other appropriate shape.

Spherical Parameterization

Figure 4:
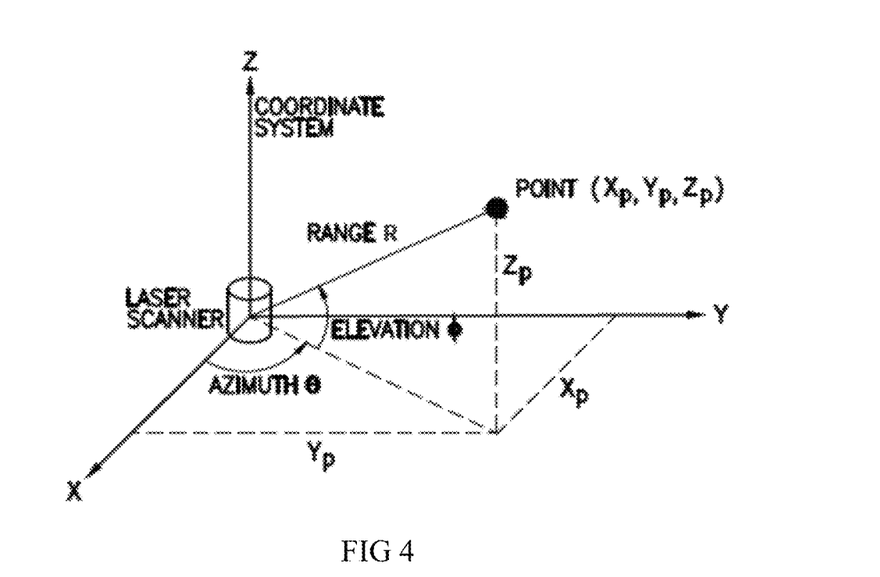
FIG. 4 displays the process of spherical parameterization.

The raw data exported from the laser scanner represents each point in the Cartesian coordinate system. This system splits the 3D world into three planes (x, y, and z) where the origin (0, 0, 0) is represented as the scanner origin, as depicted in FIG. 4.

The coordinates are parameterized spherically to azimuth angle θ, elevation angle φ, and range r. The transformation is given by:

Range$(r)=\sqrt{(x^2 \pm y^2 \pm z^2)}$

Azimuth$(\theta)=\tan^{-1}[y/x]$

Elevation$(\phi)=\tan^{-1}[z/\sqrt{(x^2+y^2)}]$

Segmentation

Figure 5:
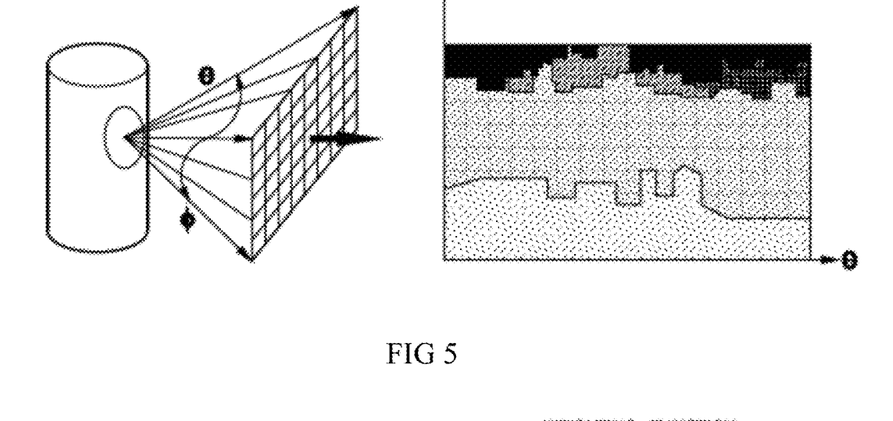
FIG. 5 displays the process of segmentation.

Segmentation is the process of dividing the data into smaller but meaningful parts termed segments, as depicted in FIG. 5. The point cloud retrieved from the laser scanner is converted to a standard file format that contains a single header line representing the number of points in the cloud followed by x, y, z and intensity values for each point separated by a new line. An example is shown below:

418733
1.997177 −20.065475 −0.973618 342
1.993637 −20.062546 −0.970444 339
1.989090 −20.016830 −1.094131 308
1.998581 −20.017014 −1.100418 362
. . .

The first line of this file is the number of points in the point cloud. The second line is read as an x position of 1.997177, a y position of −20.065475, a z position of −0.973618 and an intensity of 342. This is converted to range of 20.18, azimuth of −84.31 degrees and elevation of −13.71 degrees. It should be noted that the P20 generates intensity values in the range −2047 to +2048. These are routinely scaled to a range of 0 to 100.

The data is then segmented into unique regular bins defined by equal azimuth and elevation angles. The segments may be saved into individual files for pixel point processing to help manage physical memory usage.

Weighted Average

A weighted average is expressed mathematically as:

$$\bar{x} = \frac{w_1 x_1 + w_2 x_2 + \ldots + w_n x_n}{w_1 + w_2 + \ldots + w_n}$$

where $\bar{x}$ is the computed mean, w_n is the weight for data point n, and x_n is the value of data point n.

The process involves first computing the centrepoint of each segment to be averaged. The centrepoint is chosen as the true halfway point in both azimuth and elevation. Then a linear weighted average is applied in terms of distance from the centrepoint in terms of spherical coordinates as depicted in FIG. 6.

In the case of the point cloud generated by the laser scanner, the process is especially advantageous as it smoothes out any large deviations such as stray points that can be present due to edge effects or beam splitting.

Figure 6:
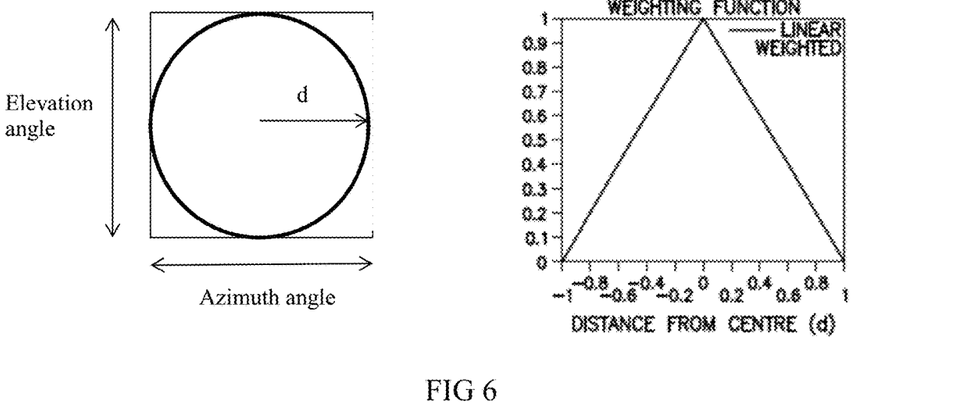
FIG. 6 displays one example of the process of point selection and weighting for pixel averaging.
Figure 7A:
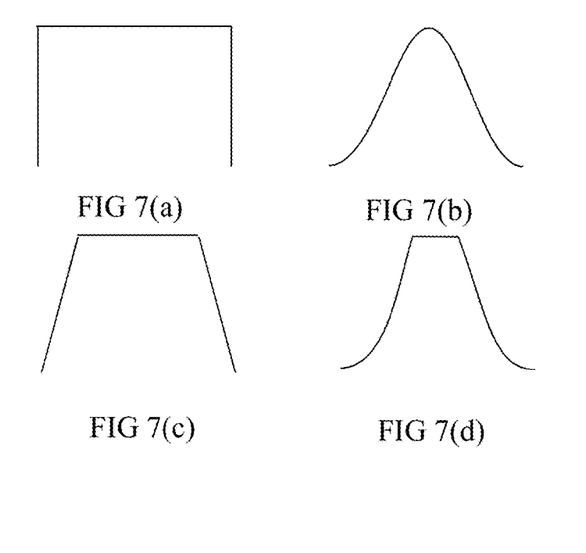
FIG. 7 depicts alternate point selection and weighting for pixel averaging.

The invention is not limited to the specific linear weighting shown in FIG. 6. Other weighting functions such as those depicted in FIG. 7 could also be used. The top hat of FIG. 7(a) weights all points equally. The normal distribution of FIG. 7(b) places greater weight on the points towards the centre of the segment. The averaging window of FIG. 7(c) applies a linear weighing to minimise edge effects and FIG. 7(d) also minimises edge effects but using a non-linear weighting.

Figure 8A:
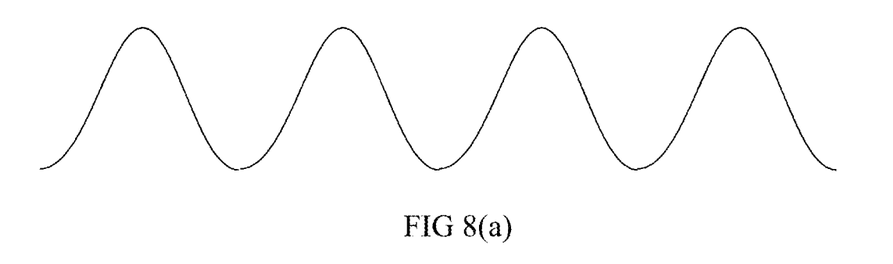
FIG. 8 shows alternate segmentation options.
Figure 8B:
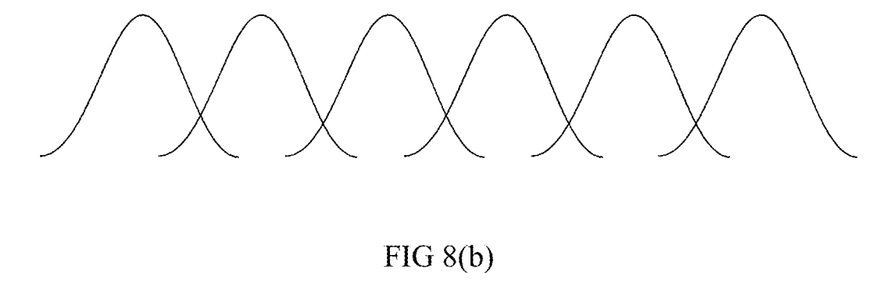

As mentioned above, the segments may be contiguous as shown in FIG. 8(a). In this embodiment all points are used in the averaging process. An alternative arrangement is shown in FIG. 8(b) in which some points are used in more than one segment. The segments are overlapping. The weight function can also be applied to the range direction of the voxels.

Figure 9:
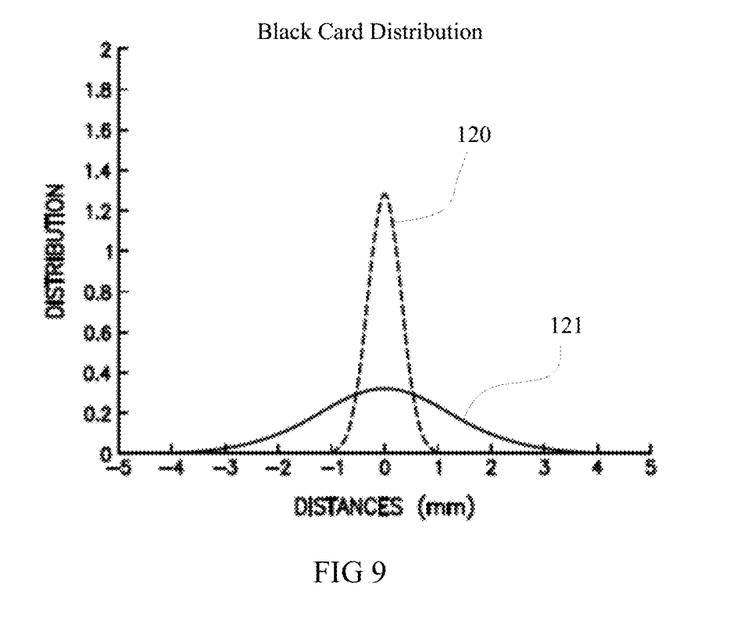
FIG. 9 demonstrates improved precision.

The benefit of the process described above is clearly demonstrated in FIG. 9. FIG. 9 shows the precision of measurements of range to a black card taken by a Leica Scanstation P20 at a range of 5 m. As can be seen, the averaged measurement 120 at 5 m is far more precise than the non-averaged measurement 121. In various tests the inventors have found that for stationary rough rock wall targets precision of +/−0.09 mm per scan was achieved with this technique compared with as much as +/−17.2 mm per scan when comparing unprocessed point cloud data. In ideal laboratory conditions for moving targets the averaged data measured readings to an accuracy of ±0.05 mm as the movement occurred compared with ideal point cloud data of the target measuring movement with an accuracy of +/−8 mm.

Figure 10:
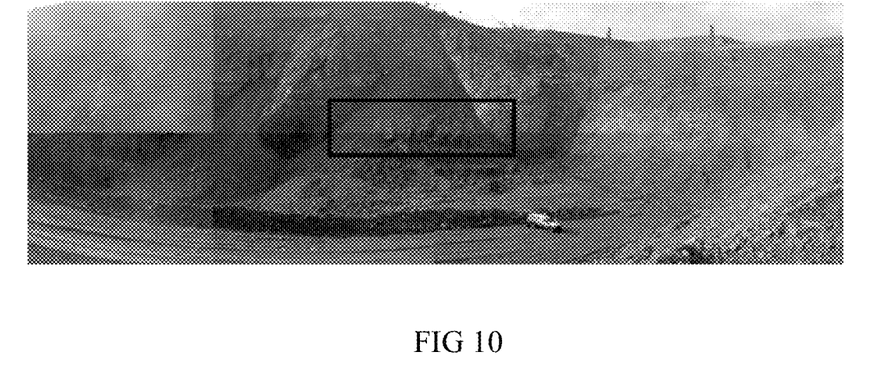
FIG. 10 shows a monitored section of slope.
Figure 11:
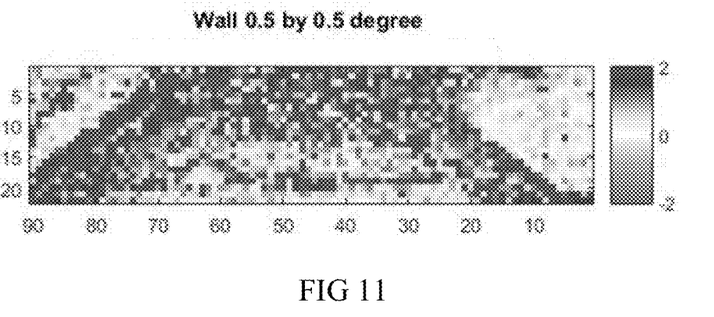
FIG. 11 shows the monitoring data.
Figure 12:
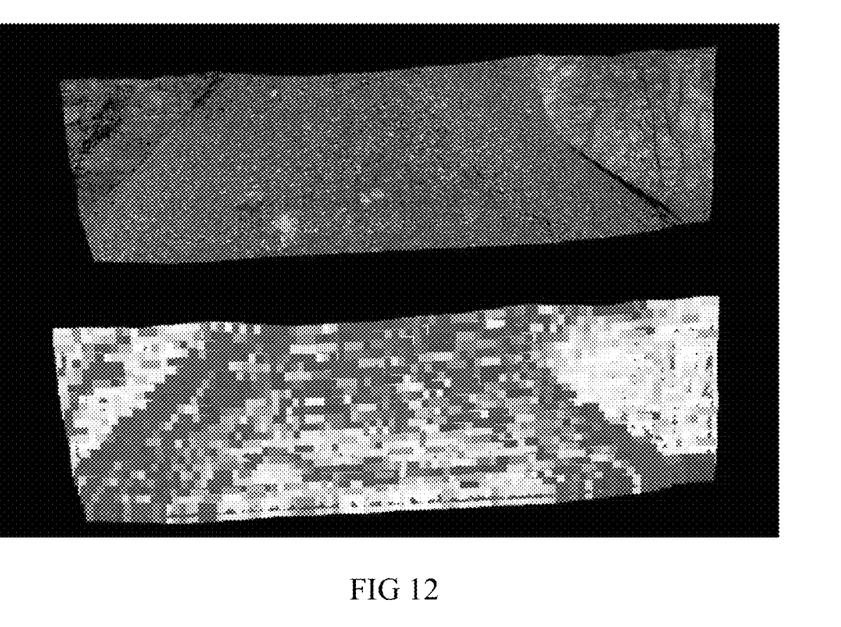
FIG. 12 shows a comparison of the slope and the monitoring data in 3D with the top image showing the monitored area and the bottom image showing deformation.

By way of example, an embodiment of the invention was used to monitor a slope in a pit that included moving and stationary regions within an area. The slope is shown in FIG. 10 and the monitored region is shown by the black box. The Slope Stability Lidar collected data from the region and the data was segmented into 0.5 by 0.5 degree voxels and the amplitude and range was averaged using the weightings of FIG. 6 and overlapping segments like FIG. 8(b). The movement (in millimetres) in each voxel is displayed in FIG. 11 using the colour palette scale to the right. The X-axis spans an azimuth range of 90 voxels (45 degrees) and the Y-axis spans an elevation range of 25 voxels (12.5 degrees). Movement towards the scanner is shown using the red end of the spectrum and movement away from the scanner is depicted using the blue end of the spectrum. Voxels with little or no movement are white or pale. FIG. 12 shows the 3D photographic point cloud generated by the Leice Scanstation P20 with the movement scan of FIG. 11 shown below using the same coordinate system. The movement depicted in FIG. 12 compares well with movement data collected using the Slope Stability Radar described in WO2002/046790.

Figure 13:
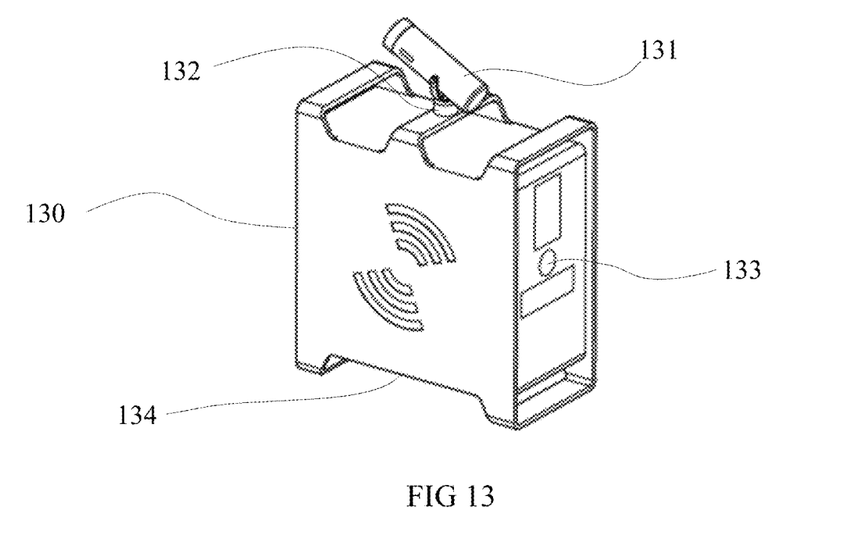
FIG. 13 shows another embodiment of a Slope Stability Lidar.
Figure 14:
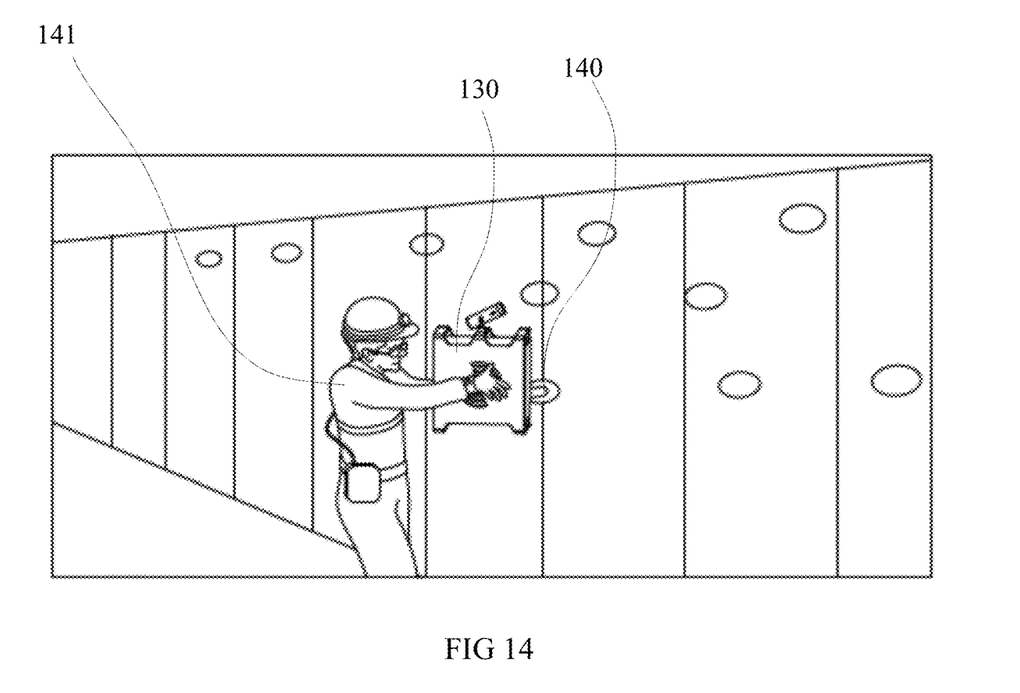
FIG. 14 shows an application in an underground mine.

The invention is not limited to use in open pits. Due to the compact nature of the Slope Stability Lidar and the intrinsic safety it can be used in underground mines. A standalone SSL pack 130 is shown in FIG. 13. The standalone SSL 130 comprises a combined Lidar and camera unit 131 that is mounted on a gimbal scanner 132 that oscillates in azimuth and elevation. A user interface and output 133 is provided directly to the processor 134, which has an internal power supply (not visible). The SSL 130 may conveniently be mounted on a stable wall (although this is not essential) of an underground mine and configured to monitor a nearby wall or roof for movement, as shown in FIG. 14. Mounting points 140 may be conveniently located so that a rock mechanic 141 can move the standalone SSL 130 from place to place as needed.

Figure 15:
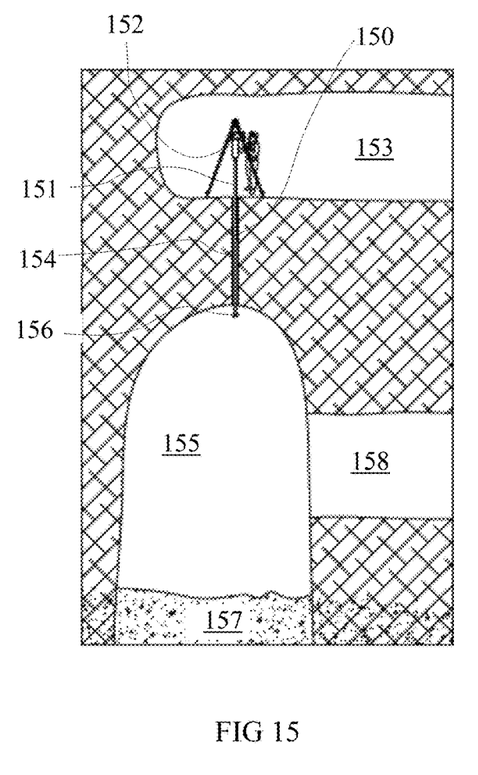
FIG. 15 shows application in an underground slope.

In another embodiment the SSL is deployed at the end of a boom to monitor a slope, as depicted in FIG. 15. A Lidar assembly 150 comprises a boom 151 and a tripod mount 152. The tripod mount 152 is positioned at the end of an access drive 153. A bore hole 154 is drilled from the access drive 153 into a slope cavity 155 and the Lidar & camera unit 156 is lowered on the boom 151 to monitor the top of the slope cavity 155 above the ore 157. The Lidar and camera unit 156 has the same elements as the standalone SSL 130. An alternate deployment could be from the gallery 158.

Figure 16:
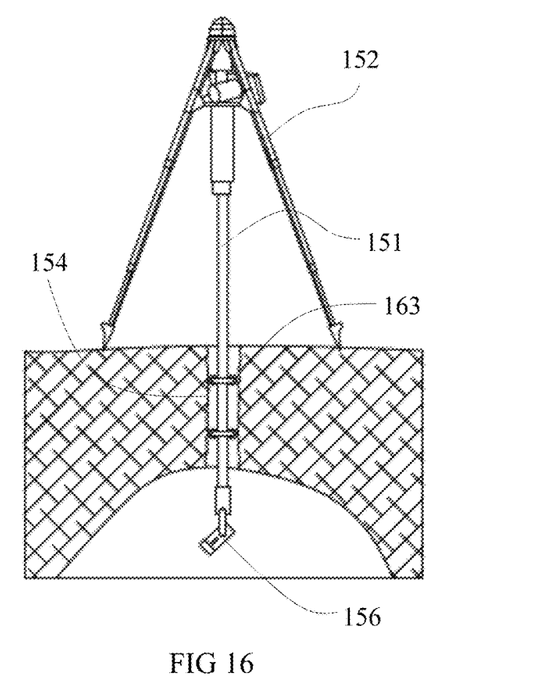
FIG. 16 is an enlarged view of a part of FIG. 15.

FIG. 16 shows an enlarged view of the SSL in the application of FIG. 15. The thickness of the roof of the slope is shown thinner than reality for easier description. It can be seen that the bore hole 154 is cased with rollers 163 to stabilise the boom 151 and remove movement.

Figure 17:
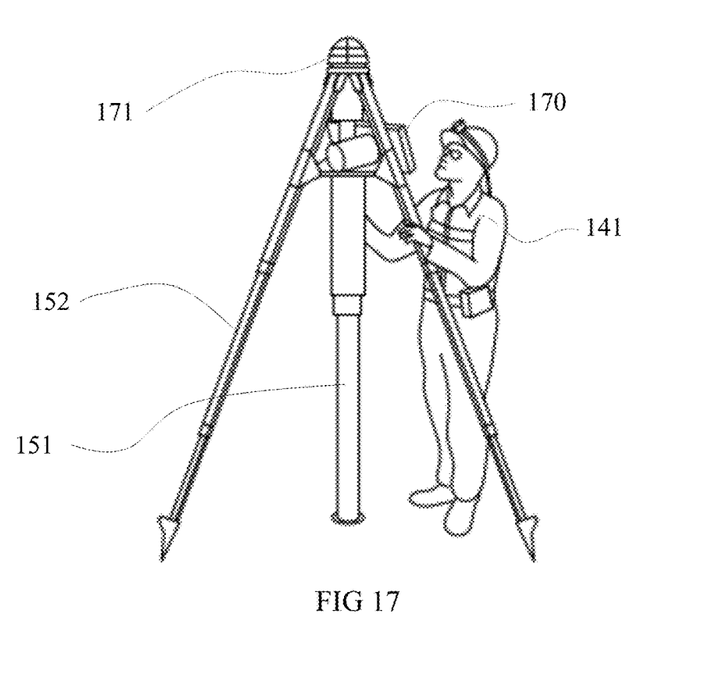
FIG. 17 is a close up view of the Slope Stability Lidar of FIG. 16.

The tripod mount 152 is shown in more detail in FIG. 17 including the user interface 171 for use by the worker 141. The user interface 170 and processor allows the worker 141 to control azimuth and elevation of the Lidar scan and to observe a local display. A communication module 171 provides an uplink to communicate with a mine control room. It also may provide a local alarm to give warning of dangerous movement.

The Lidar unit 156 need not be located at the end of the boom 151 but could be located at the tripod mount 152 with the laser beam delivered through the boom 151 using suitable optics. This embodiment removes all sources of spark from the slope and is intrinsically safe. The same principal may be applied for other underground applications with any source of spark being located well away from potential danger and the laser beam being conveyed to the monitor site by optics, such as optical fibre.

Figure 18:
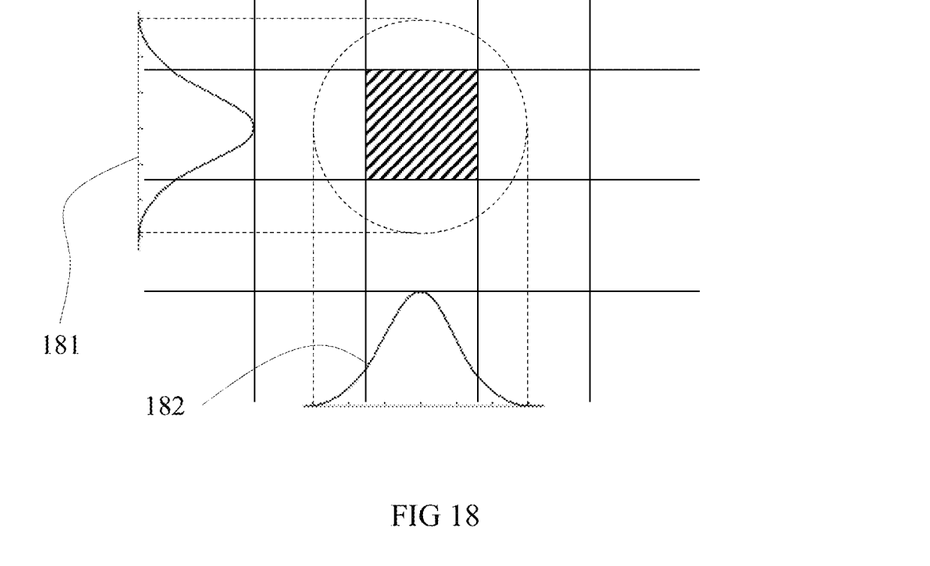
FIG. 18 further explains the formation of a pixel.

Although various pixel shapes are disclosed above, the preferred pixel shape is square. An effective manner of producing square pixels using the method described herein is shown in FIG. 18. Although the point cloud data is captured from a dome centred on the Lidar, it can be rolled out to a grid of azimuth and elevation as shown in FIG. 18. The size of each square of the grid in the example of FIG. 18 is 0.5 degrees by 0.5 degrees. The weighting factors 181, 182 are applied to the data in the manner depicted in FIG. 18 and described above to produce a square pixel.

Figure 19:
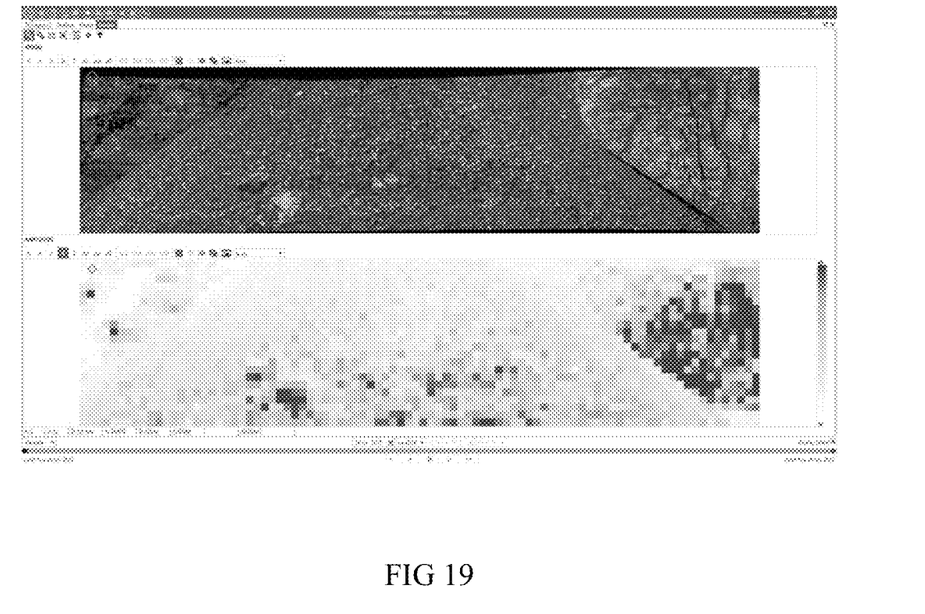
FIG. 19 shows a typical SSL display of amplitude co-registered with a visual image.
Figure 20:
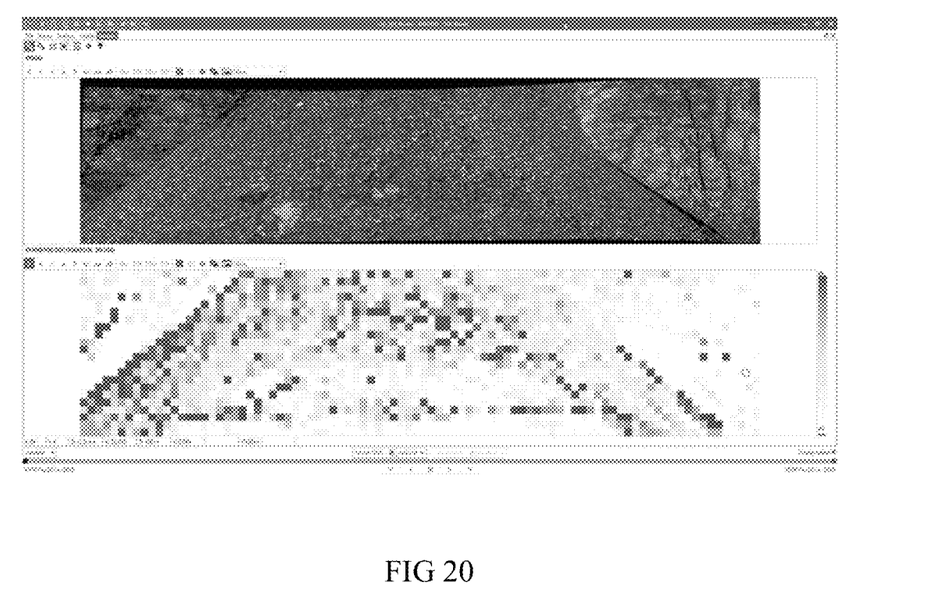
FIG. 20 shows a typical SSL display of deformation co-registered with a visual image.

The processing shown in FIG. 18 is applied to produce the display of FIG. 19. The display format is familiar to users because it is the same as the display presented for the SSR product mentioned earlier. FIG. 19 shows a visual image of a monitored region with an amplitude map co-registered below. FIG. 20 shows the same scene but with movement data rather than amplitude data.

Figure 21:
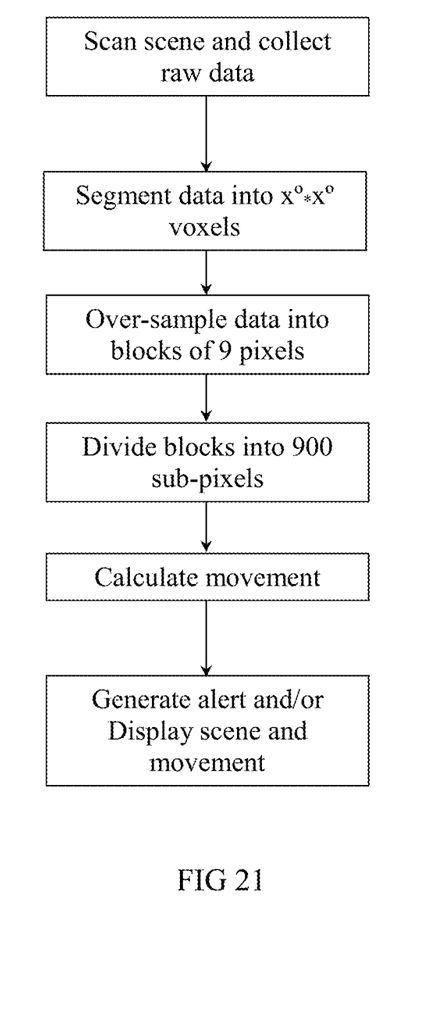
FIG. 21 shows a typical flow chart depicting the steps of a method according to the invention.

An alternate spatial averaging process is depicted in FIG. 21. Raw data is acquired as described previously and converted to a spherical coordinate system. The data is segmented into voxels of a selected size; say 1°×1°. The voxel is over-sampled by collecting data from the neighbouring voxels to produce a block of 9 voxels measuring 3°×3°. The block is divided into 900 0.1°×0.1° sub-voxels. The mean range for each sub-voxel is determined using a weighted average calculation as described previously. The mean range for each sub-voxel is compared with the mean range for that sub-voxel calculated from the previous scan. The median value for the 900 sub-voxels is determined and this value is displayed as the movement value for the selected 1°×1° voxel. The process is repeated for each 1°×1° voxel to generate a movement map.

As an optional variation the median movement value may be determined from a subset of the 900 sub-voxels, for instance by applying a threshold. The threshold may be set to exclude any range change outlier. That is to say, if the range change exceeds a reasonable limit it is excluded. This will typically be some number of standard deviations from the mean value.

Figure 22:
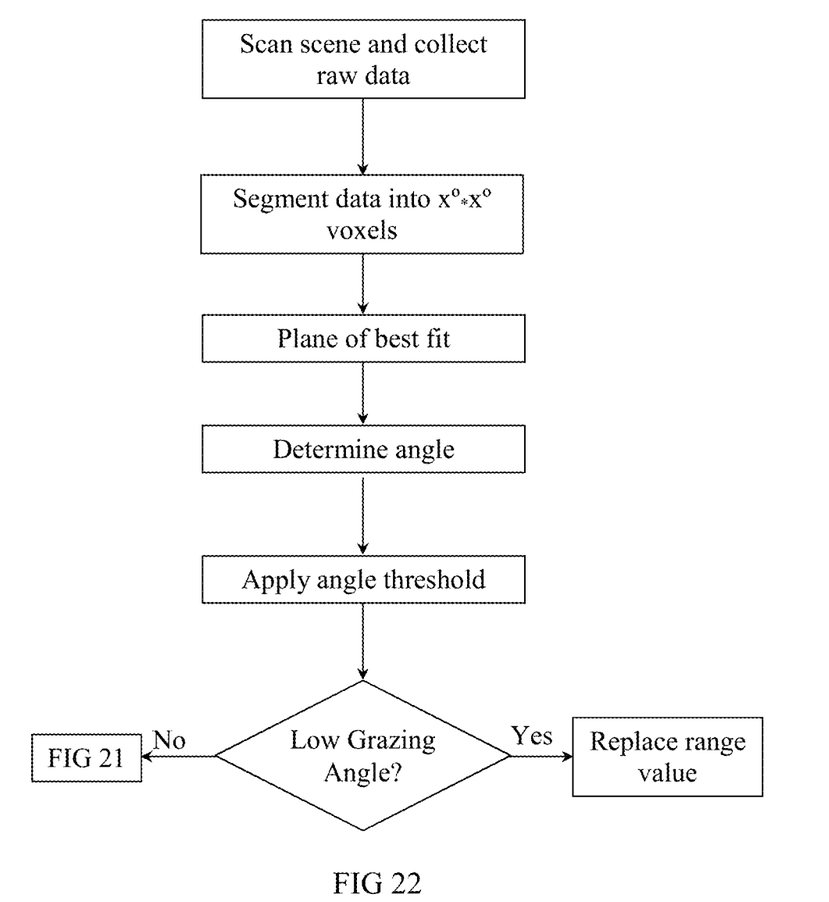
FIG. 22 shows a typical flow chart depicting the steps of a method to deal with low grazing angle noise according to the invention.

For regions of low grazing angle between the area being monitored and the Slope Stability Lidar, a small Lidar angular beam pointing error can result in a large change in range value. Also, low grazing angles provide less back scatter and therefore lower signal to noise ratio, which means higher error in the range measurements. This can lead to large errors in deformation monitoring. To deal with this error a method has been developed as shown in FIG. 22. Raw data is acquired and converted to a spherical coordinate system. The data is segmented into voxels of a selected size; say 1°×1°. The next step is to describe a plane of best fit for the point cloud data inside each voxel. Then an angle is determined between the plane of best fit and a line of sight (LOS) vector to the scanner from the centre of the voxel. The angle is measured against a threshold. If the angle is above the threshold the process of FIG. 21 is followed. If the angle is low (grazing angle) the range value from the LOS vector is replace with a range value from the normal vector to the plane of best fit, and then the process of FIG. 21 is followed. The plane of best fit could be extended to use more of the point cloud around the voxel. This would make the plane less sensitive to wall roughness.

In the domain of geotechnical engineering in a mining context, the behaviour of the rock surface (otherwise known as the coherence of the surface) is important to detect and measure. A rock surface that cracks or breaks up or erodes can give vital clues to impending collapse, while conversely, in the centre of a moving block of rock coherence may be high while the entire slab moves compared with the incoherent edges of the block that grind away and splinter as the rock slab moves. At other times the coherence of a target may be affected by vegetation, passing people, machines or vehicles, or by water or other objects moving on the surface, meaning that a measure of coherence of the surface can at times be used as a data quality indicator. The Applicant has previously described the use of coherence with slope stability radar in their earlier international publication WO/2007/009175, the content of which is incorporated herein by reference.

The inventors have determined that a spatial coherence metric for each voxel generated by the SSL method can be calculated based on changes in the spatial distribution of the point cloud range measurements for each voxel and its surrounding neighbours between scans (or over time). Such a metric can be shown on a scale of 1 to 0, where 1 is 100% coherent and 0 is 0% coherent. The coherence metric describes how the small scale spatial character of the rock wall scattering surface changes between scans. In comparison, deformation describes a larger scale or voxel size change in the bulk range to the rock wall surface. Either range or amplitude distributions, or the combination of both, can be used to determine the coherence metric. The coherence metric can then be generated as an image for the area.

The inventors have found for this geotechnical application there is generally too much noise in raw Lidar point cloud data for a useful coherence metric and some level of point cloud averaging is required.

In one embodiment of the invention, raw data is acquired as described previously and converted to a spherical coordinate system. The data is segmented into voxels of a selected size; say 1°×1°. The voxel is over-sampled by collecting data from the neighbouring voxels to produce a block of 9 voxels measuring 3°×3°. The block is divided into 900 0.1°×0.1° sub-voxels. The mean range and mean amplitude for each sub-voxel is determined using a weighted average calculation as described previously. The sub-voxel spatial distributions are compared with the previous scan to determine the coherence for the given voxel. The value is displayed as the coherence value for the selected 1°×1° voxel typically on a scale of 1 to 0 where 1 is 100% coherent and 0 is 0% coherent. The process is repeated for each 1°×1° voxel to generate a coherence image or map with a colour gradient applied to the spread of values.

A Delta Coherence image or map can be generated from this coherence data if scanning continues over a longer time period, for example, three to tens-of-thousands of scans. To generate such an image or value the above process is repeated many times over many scans, and the lowest coherence metric (ie., minimum hold function) for each 1o×1o voxel is displayed over the selected time period as the delta coherence value for that voxel. Coherence maps may be displayed in the form described in our earlier international application mentioned above.

The above example is purely for the purpose of explanation. The invention is not limited to voxels of the specific size mentioned but may be in the ranges mentioned earlier. The number of neighbouring voxels may also be varied. For instance, voxels may be circular or hexagonal and therefore have 6 near neighbours and 8 corner neighbours.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this invention is intended to embrace all alternatives, modifications and variations of the present invention that have been discussed herein, and other embodiments that fall within the spirit and scope of the above described invention.

What is claimed is:

1. A Slope Stability Lidar comprising:
a laser producing a beam of optical radiation;
a scanner that directs the beam of optical radiation into an area of terrain on a point by point basis, each point having an elevation and azimuth with respect to the laser;
a detector that receives reflected optical radiation from each point; and
a processor programmed to:
acquire data from the detector and process the data to compile direction data, range data and amplitude data for each point;
segment the acquired data into blocks of data defining a voxel, wherein each block forms a corresponding voxel being selected based on specific voxel size, such that all range points are within an azimuth by elevation both from 0.1 degrees to 1.0 degrees;
perform spatial averaging of the acquired range data within each voxel to produce a precise voxel range value for each voxel by:
determining a voxel centerpoint of the corresponding voxel; and
applying a weighting function to the range data of each point included in the corresponding voxel based on the determined voxel centerpoint;
compare voxel range values over time to identify movement of the area of terrain; and
generate an alert if movement of the area of terrain exceeds a threshold.

2. The Slope Stability Lidar of claim 1 wherein the laser is a pulsed laser and the processor determines range to a point using a time of flight calculation.

3. The Slope Stability Lidar of claim 1 wherein the scanner scans the beam in azimuth using a rotating base and in elevation using a rotating mirror.

4. The Slope Stability Lidar of claim 1 wherein each point has a location determined in Cartesian coordinates (x,y,z) or polar coordinates (r,θ,ϕ).

5. The Slope Stability Lidar of claim 1 wherein each block of data forming a voxel is selected based on a voxel size of azimuth by elevation of most suitably 0.5 degrees by 0.5 degrees.

6. The Slope Stability Lidar of claim 1 wherein each block of data defining a voxel size is segmented by range.

7. The Slope Stability Lidar of claim 1 wherein the processor is also programmed to average the acquired amplitude data to produce an average amplitude value for each voxel.

8. The Slope Stability Lidar of claim 7 wherein the average amplitude value for each voxel is used by the processor to generate a display of an image of the area.

9. The Slope Stability Lidar of claim 8 wherein the processor displays the identified movement on the image of the area.

10. The Slope Stability Lidar of claim 8 wherein the processor co-registers the image of the area with a photograph or video of the area.

11. The Slope Stability Lidar of claim 1 wherein the processor is further programmed to calculate a coherence metric for each voxel.

12. A method of monitoring slope movement including the steps of:
   directing a beam of optical radiation into an area of terrain;
   scanning the beam of optical radiation in elevation and azimuth so as to cover the area of terrain on a point by point basis;
   detecting radiation reflected from each point;
   acquiring data from the detector and processing the data to compile direction data, range data and amplitude data for each point;
   segmenting the acquired data into blocks of data defining a voxel, wherein each block forms a corresponding voxel being selected based on specific voxel size, such that all range points are within an azimuth by elevation both from 0.1 degrees to 1.0 degrees;
   performing spatial averaging of the acquired range data within each voxel to produce a precise range value for each voxel by:
   determining a voxel centerpoint of the corresponding voxel, and
   applying a weighting function to the range data of each point included in the corresponding voxel based on the determined voxel centerpoint;
   comparing voxel range values over time to identify movement of the area of terrain; and
   generating an alert if movement of the area of terrain exceeds a threshold.

13. The method of claim 12 wherein the step of performing spatial averaging involves a weighted average and the weighting function is selected from: top hat; normal; linear edge minimisation; non-linear edge minimisation.

14. The method of claim 12 wherein the step of segmenting the acquired data involves using data from some points in more than one block.

15. The method of claim 12 further including the steps of:
   over-sampling a selected voxel by collecting data from neighbouring voxels;
   dividing the selected voxel and neighbouring voxels into sub-voxels;
   determining a mean range for each sub-voxel using a weighted average calculation;
   comparing a mean range for each sub-voxel to a mean range for that sub-voxel calculated from a previous scan;
   determining a median value for all sub-voxels and displaying the median value as the movement value for the selected voxel.

16. The method of claim 12 further including the step of averaging the acquired amplitude data to produce an average amplitude value for each voxel.

17. The method of claim 16 wherein the average amplitude value for each voxel is used in a further step of the method to generate a display of an image of the area.

18. The method of claim 17 wherein the identified movement is displayed on the image of the area.

19. The method of claim 12 further including the step of calculating a coherence metric for each voxel.

* * * * *